United States Patent
Kojima et al.

(10) Patent No.: US 11,835,201 B2
(45) Date of Patent: Dec. 5, 2023

(54) OPTICAL LENS

(71) Applicant: KOITO ELECTRIC INDUSTRIES, LTD., Shizuoka (JP)

(72) Inventors: Yasuyo Kojima, Shizuoka (JP); Youmei Kaminaga, Shizuoka (JP)

(73) Assignee: KOITO ELECTRIC INDUSTRIES, LTD., Shizuoka (JP)

(*) Notice: Subject to any disclaimer, the term of this patent is extended or adjusted under 35 U.S.C. 154(b) by 17 days.

(21) Appl. No.: 17/622,367

(22) PCT Filed: Jun. 8, 2020

(86) PCT No.: PCT/JP2020/022588
§ 371 (c)(1),
(2) Date: Dec. 23, 2021

(87) PCT Pub. No.: WO2020/261967
PCT Pub. Date: Dec. 30, 2020

(65) Prior Publication Data
US 2022/0235917 A1    Jul. 28, 2022

(30) Foreign Application Priority Data

Jun. 28, 2019 (JP) .................. 2019-120777

(51) Int. Cl.
*F21S 43/241* (2018.01)
*F21S 41/151* (2018.01)
(Continued)

(52) U.S. Cl.
CPC ............ *F21V 13/04* (2013.01); *F21S 41/151* (2018.01); *F21S 41/26* (2018.01); *F21S 43/241* (2018.01);
(Continued)

(58) Field of Classification Search
CPC ....... F21V 5/046; F21S 43/239; F21S 43/241; F21S 43/243; F21S 43/249; F21S 41/06;
(Continued)

(56) References Cited

U.S. PATENT DOCUMENTS

2009/0296388 A1* 12/2009 Wu ................ G02B 6/0018
362/235
2012/0140461 A1  6/2012 Pickard

FOREIGN PATENT DOCUMENTS

JP  2006-232037 A   9/2006
JP  2009-295577 A  12/2009
(Continued)

OTHER PUBLICATIONS

International Search Report for PCT application No. PCT/JP2020/022588 issued by Japan Patent Office as ISA dated Jul. 21, 2020.

*Primary Examiner* — Sean P Gramling
(74) *Attorney, Agent, or Firm* — Kubotera & Associates, LLC

(57) ABSTRACT

An optical lens (10) capable of facilitating efficient light distribution control with a simple configuration is provided. It comprises a plurality of light distribution control parts (11) continuing in a bilateral direction such that each of the light distribution control parts corresponds to each column of LEDs (22), the light distribution control parts defining optical paths of light from the LEDs (22) on a column basis, one light distribution control part (11) discharges light entering from the LEDs (22) in a column corresponding thereto in one direction of the bilateral direction that intersects the optical axes, and a further light distribution control part (11) discharges light entering from the LEDs (22) in a column corresponding thereto in a further direction of the bilateral direction that intersects the optical axes.

6 Claims, 14 Drawing Sheets

(51) Int. Cl.
| | |
|---|---|
| *F21S 41/26* | (2018.01) |
| *F21V 13/04* | (2006.01) |
| *F21V 5/02* | (2006.01) |
| *F21V 7/10* | (2006.01) |
| *F21V 5/04* | (2006.01) |
| *F21Y 105/16* | (2016.01) |

(52) U.S. Cl.
CPC ................ *F21V 5/02* (2013.01); *F21V 5/043* (2013.01); *F21V 7/10* (2013.01); *F21Y 2105/16* (2016.08)

(58) Field of Classification Search
CPC ........ F21S 41/265; F21S 41/27; F21S 41/275; F21S 41/151; F21S 41/153
See application file for complete search history.

(56) References Cited

FOREIGN PATENT DOCUMENTS

| JP | 2013-061399 A | 4/2013 |
|---|---|---|
| JP | 2013-545254 A | 12/2013 |

\* cited by examiner

OPTICAL LENS

TECHNICAL FIELD

The present invention relates to an optical lens, which is disposed in front of a light source, for achieving light distribution control of light from the light source.

BACKGROUND ART

Traditionally, car side pilot lamps are provided on exterior walls of a railway vehicle above and near doors and are lit to inform of opening and closing of the doors while the vehicle is stopped. For example, see Patent Literature 1. Generally, such a car side pilot lamp is used by a station staff on a platform or a conductor on the vehicle to check whether it is lit from the bilateral sides of the lamp itself, that is, in a front-rear direction of the vehicle. Accordingly, the car side pilot lamp has basically been configured to radiate light in 2 directions of bilateral sides of the lamp itself (front and rear of the vehicle) and to also distribute light in front of the lamp itself (side of the vehicle).

Previously, a lamp bulb has been used for a light source of the car side pilot lamp, while an LED (light emitting diode) is used these days. For example, see Patent Literature 1. When an LED is to be used, it is conceivable to reuse an attachment unit for a lamp bulb originally provided on the exterior wall of the vehicle and to change only a circuit board for an LED. Here, a problem with merely using an LED disposed on a single circuit board as described in Patent Literature 1 is that light is concentrated only in front and a required luminous intensity cannot be achieved on crucial bilateral sides due to narrow directivity of the LED in terms of its radiation direction.

Accordingly, it has been a practice to, for example, provide 2 circuit boards for LEDs and dispose the circuit boards inclined in 2 directions of the bilateral sides respectively. However, a problem is that 2 circuit boards are required, a sheet metal for supporting each of the circuit boards is additionally required, wirings to the circuit boards each of which is directed differently are complicated, and therefore the assembly is cumbersome and costly. In addition, to ensure that light of the car side pilot lamp is distributed not only on the bilateral sides but also in front, extra work such as bending some of LEDs orthogonally from the circuit board to face the LEDs frontward is needed, which is further cumbersome.

To solve such problems, it is conceivable to use a lens for achieving light distribution control as means for simplifying such special light distribution control in the case in which an LED is used for a car side pilot lamp. For example, although not for a car side pilot lamp, there has been a known lens that can diffuse light propagating in a straight-ahead direction from an LED on a circuit board in lateral directions. For example, see Patent Literature 2. The lens diffuses light entering from a single LED in lateral directions not only on bilateral sides that are perpendicular to the optical axis but also in the entire circumference direction that is substantially horizontal.

CITATION LIST

Patent Literature

Patent Literature 1: Japanese Patent Laid-Open No. 2006-232037
Patent Literature 2: Japanese Patent Laid-Open No. 2013-61399

SUMMARY OF INVENTION

However, in the case in which the lens described in Patent Literature 2 described above is used for achieving light distribution control of a car side pilot lamp, a problem is that too much distributed light in unwanted directions for a car side pilot lamp is involved, degrading the radiation efficiency. In particular, it has actually been difficult to achieve light distribution control that is mainly directed to the bilateral sides with respect to the light source.

An object of the present invention, which has been made in consideration of the problems with prior arts as described above, is to provide an optical lens capable of facilitating efficient light distribution control targeting required directions with a simple configuration.

In order to attain the object, the present invention is an optical lens, which is disposed in front of a light source, for achieving light distribution control of light from the light source, the light source including a plurality of light-emitting elements arranged in at least two or more columns on a circuit board in a bilateral direction and disposed in the same direction such that optical axes are in parallel to each other, the optical lens comprising a plurality of light distribution control parts continuing in the bilateral direction such that each of the light distribution control parts corresponds to each column of the light-emitting elements, the light distribution control parts defining optical paths of light from the light-emitting elements on a column basis, wherein among the light distribution control parts, at least:

one light distribution control part discharges light entering from the light-emitting elements in a column corresponding to the light distribution control part in one direction of the bilateral direction that intersects the optical axes of the light-emitting elements; and a further light distribution control part discharges light entering from the light-emitting elements in a column corresponding to the light distribution control part in a further direction opposite to the one direction of the bilateral direction that intersects the optical axes of the light-emitting elements.

According to the optical lens according to the present invention, it is possible to facilitate efficient light distribution control targeting required directions with a simple configuration.

DETAILED DESCRIPTION OF THE PREFERRED EMBODIMENTS

Figure 1:
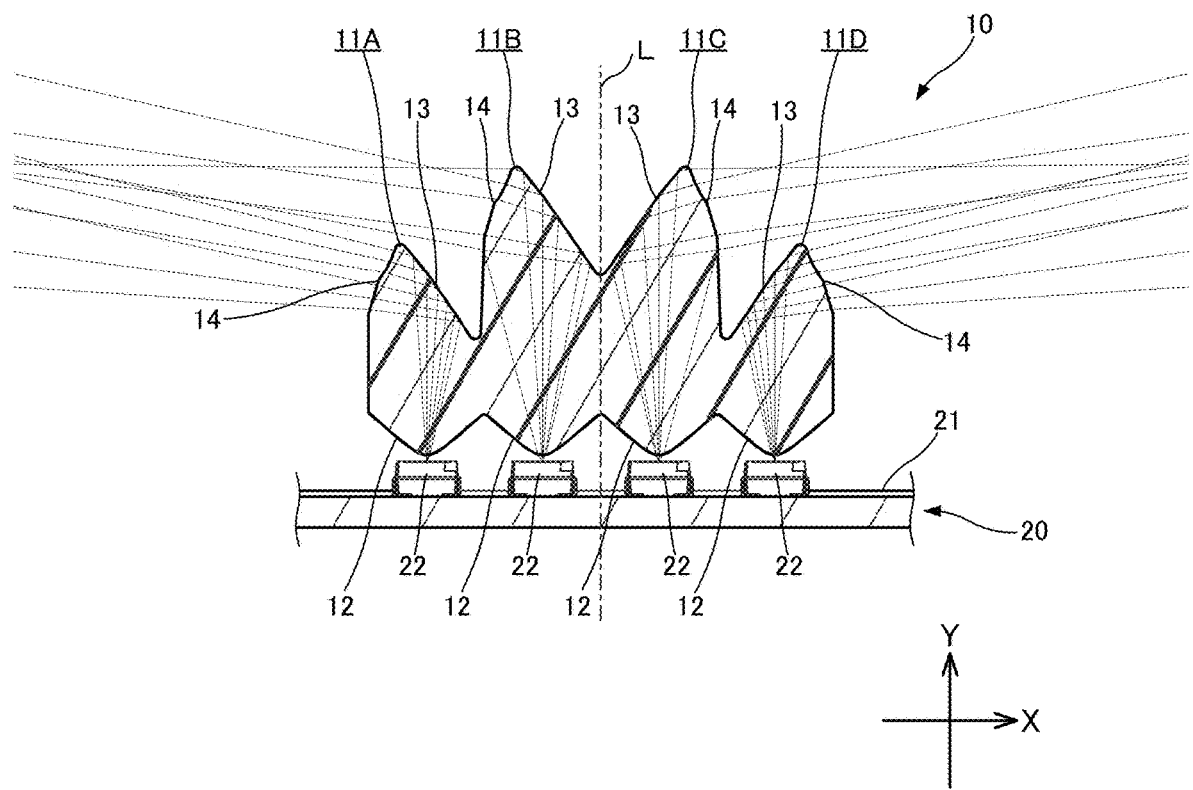
FIG. 1 is an explanatory drawing illustrating light distribution control of an optical lens according to a first embodiment of the present invention.

Embodiments representative of the present invention will now be described with reference to drawings.

Optical lenses 10 according to the embodiments are each disposed in front of a light source for achieving light distribution control of light from the light source. Hereinafter, description will be made as to examples in which the optical lens 10 is applied to a car side pilot lamp 1 provided on an exterior wall of a railway vehicle, for example. Note that the present invention is not limited to those embodiments described below. Further, detailed description of already known matters and duplicated description on a substantially similar configuration may not be repeated as necessary.

First Embodiment

<Configuration of Light Source>

A light source 20 subjected to light distribution control in combination with the optical lens 10 will first be described.

The light source 20 according to the embodiment is provided with a plurality of light-emitting elements mounted on a single circuit board 21. Here, suitable light-emitting elements are, for example, LEDs 22. Specifically, LEDs 22 (see FIG. 9) are, for example, of a surface mounted LED chip, the configuration of which is well known and therefore detailed description thereof is omitted.

LEDs 22 are not limited to those of surface mounted LED chip, and may be an LED lamp with a chip embedded in a cannon ball-shaped mold. In any case, light from each of the LEDs 22 is discharged in a radiation range expanding at a predetermined angle around an optical axis that is substantially perpendicular to a reference surface of the circuit board 21. Note that any luminescent color of the LED 22 may be selected.

As illustrated in FIGS. 7 to 10, the circuit board 21 is formed in, for example, a circular shape, wiring circuits are provided on a surface of the circuit board 21, and a plurality of LEDs 22 are mounted on the wiring circuits. Here, the LEDs 22 are arranged in at least two or more columns on a circuit board 21 in a bilateral direction and disposed in the same direction such that optical axes are in parallel to each other, that is, frontward.

Figure 6:
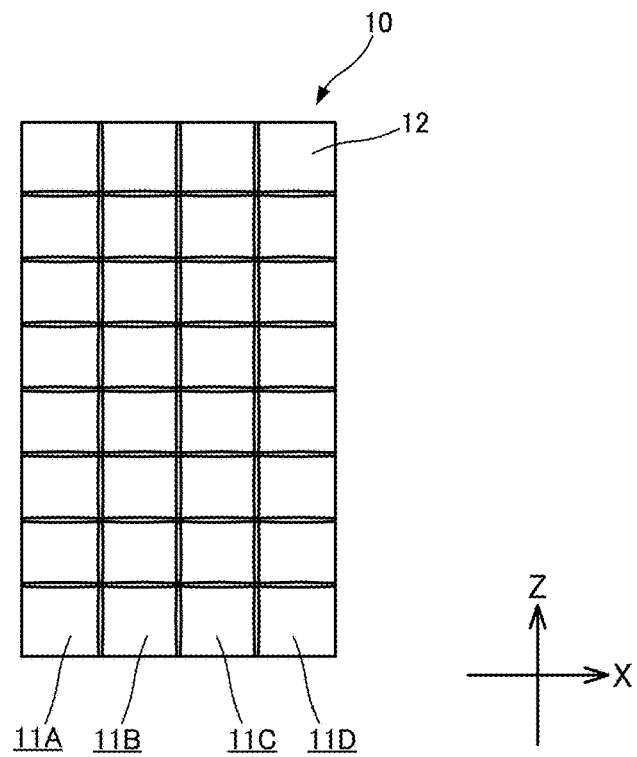
FIG. 6 is a back view illustrating the optical lens according to the first embodiment of the present invention.
Figure 7:
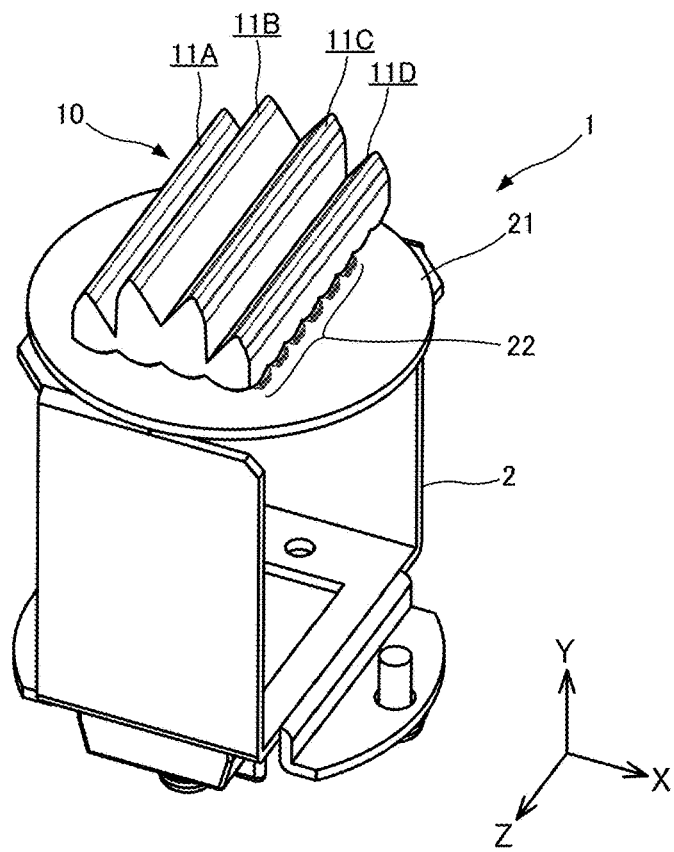
FIG. 7 is a perspective view illustrating a part of a car side pilot lamp provided with the optical lens according to the first embodiment of the present invention.
Figure 9:
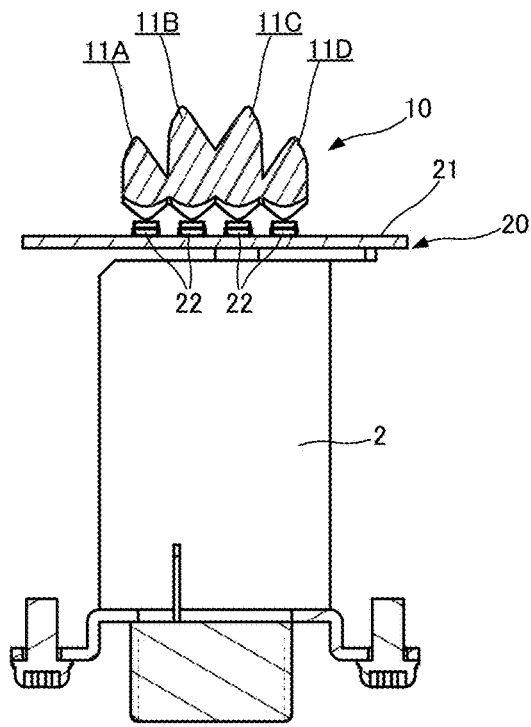
FIG. 9 is a line IX-IX sectional view of FIG. 8.
Figure 10:
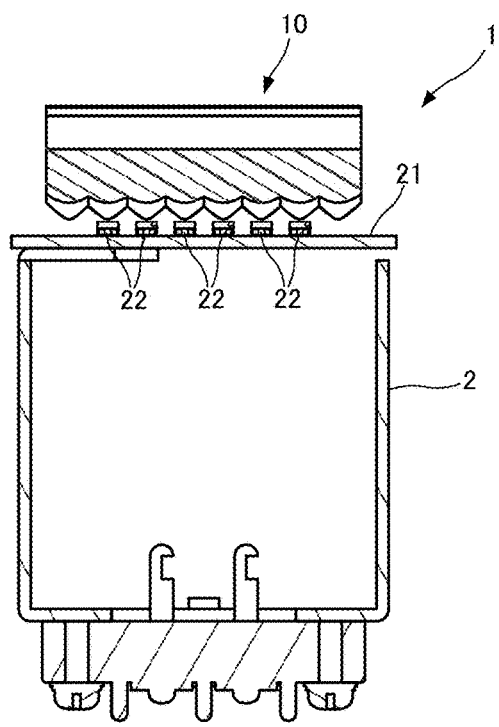
FIG. 10 is a line X-X sectional view of FIG. 8.
Figure 11:
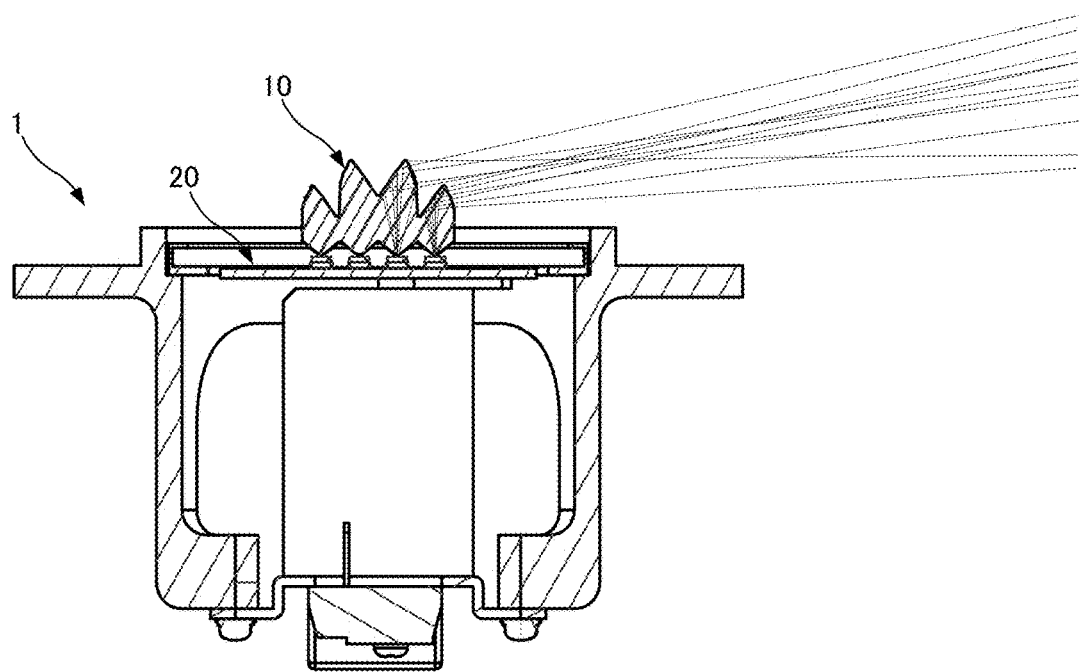
FIG. 11 is an explanatory drawing illustrating light distribution control of the car side pilot lamp provided with the optical lens according to the first embodiment of the present invention.

The LEDs 22 in the embodiment are arranged in a portion near the center on the surface of the circuit board 21 in 4 columns in the bilateral direction as illustrated in FIG. 9, and 6 LEDs for each column are disposed equidistantly from each other as illustrated in FIG. 10, and therefore a total of 24 LEDs 22 are mounted in a matrix form. The optical lens 10 is disposed such that it overlaps thus-arranged LEDs 22 in their front. Note that the shape of the circuit board 21 is not limited to a circular shape and is a design matter that can be defined as necessary.

<Configuration of Optical Lens>

(Outline)

As illustrated in FIGS. 1 to 6, the optical lens 10 is assembled such that it covers the LEDs 22 on the circuit board 21 in their front to which the optical axes are directed (see FIG. 7), for achieving light distribution control of light from the LEDs 22 on a column basis of the LEDs 22. The optical lens 10 according to the embodiment is used as an optical component that constitutes a car side pilot lamp 1 described later.

In FIGS. 1 to 6, directions of 3 axes in the Cartesian coordinates system will first be defined. The X-axis indicates a bilateral direction of the optical lens 10 (and circuit board 21), which coincides with the direction in which columns of LEDs 22 are arranged and coincides with the direction that is perpendicular to optical axes of the LEDs 22. The Y-axis is in the direction that is perpendicular to the X-axis, and indicates a front-rear direction of the optical lens 10 (and circuit board 21), which coincides with the direction that is parallel to the optical axes of the LEDs 22. The Z-axis is in the direction that is perpendicular to the X-axis and the Y-axis, and indicates an up-down direction of the optical lens 10 (and circuit board 21), which coincides with the direction (row direction) in which 6 LEDs 22 for each column are arranged.

Figure 8:
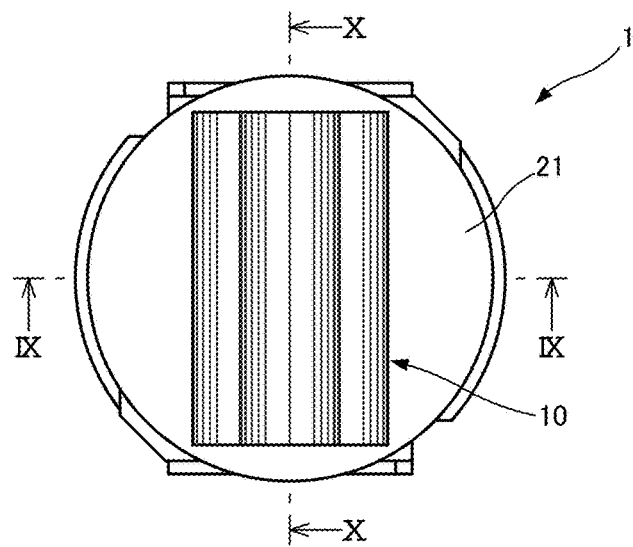
FIG. 8 is a front view illustrating a part of the car side pilot lamp provided with the optical lens according to the first embodiment of the present invention.

As illustrated in FIG. 1, the optical lens 10 is generally longitudinally rectangular, which is elongated in the up-down direction as seen in plan view, and formed to have the same cross-sectional shape over the entire length in the up-down direction (see FIG. 8). The optical lens 10 may be integrally formed in forming dies from a transparent material such as acrylic and polycarbonate, for example, or may be formed by being cut out of a lump of a transparent material.

(Light Distribution Control Part)

The optical lens 10 achieves light distribution control of light from the LEDs 22 on the circuit board 21 on a column basis of the LEDs 22. In other words, the optical lens 10 includes a plurality (4) of light distribution control parts 11A, 11B, 11C, 11D continuing in the bilateral direction such that each of the light distribution control parts corresponds to each column (of 4 columns) of the LEDs 22, the light distribution control parts defining routes of light from a plurality (6) of the arranged LEDs 22 on a column basis. Note that the light distribution control parts 11A, 11B, 11C, 11D may collectively be referred to simply as a light distribution control part 11.

Equal numbers of the light distribution control parts 11 are provided right-left symmetrically across the center line L of the bilateral direction of the optical lens 10 (see FIG. 1). In the embodiment, 2 light distribution control parts 11 for each of opposite right and left sides across the center line L of the optical lens 10, and therefore a total of 4 light distribution control parts continue integrally in a mutually neighboring state. Each of the light distribution control parts 11 corresponds to each column of 4 columns of the arranged LEDs 22 in the bilateral direction on the circuit board 21. Although the light distribution control parts 11 are integrally formed such that each of the light distribution control parts is arranged side-by-side as one region of the optical lens 10, the light distribution control parts may be a combination of separately provided ones.

(Light Distribution Control on Bilateral Sides)

The 2 light distribution control parts 11A, 11B arranged to the left among the light distribution control parts 11 are formed to discharge light entering from the LEDs 22 in columns corresponding to the respective light distribution control parts 11 in one direction (left direction of the paper in FIG. 1) of the bilateral direction that intersects the optical axes of the LEDs 22 on a column basis. Here, "one direction of the bilateral direction that intersects the optical axes" is not limited to the direction that is perpendicular to the optical axes, but is enough if it is one direction of the directions extending in the bilateral sides around the optical axes at an angle close to the right angle to a certain extent at which the direction intersects the optical axes.

On the other hand, the 2 light distribution control parts 11C, 11D arranged to the right among the light distribution control parts 11 are formed to discharge light entering from the LEDs 22 in columns corresponding to the respective light distribution control parts 11 in a further direction opposite to the one direction (right direction of the paper in FIG. 1) of the bilateral direction that intersects the optical axes of the LEDs 22 on a column basis. Here, "a further direction opposite to the one direction" is not necessarily limited to the direction that is opposite on the straight line extending in the one direction, but may be directions extending in a line-symmetrical manner with respect to a straight line extending in one direction around the center line L.

In the light distribution control parts 11, the light distribution control part 11A at the left end and the light distribution control part 11D at the right end are formed in the same shape, while oriented oppositely from each other in a right-left symmetry. Similarly, the light distribution control part 11B to the left and the light distribution control part 11C to the right are formed in the same shape, while oriented oppositely from each other in a right-left symmetry. Each of the light distribution control parts 11 has substantially the same cross-sectional shape in the up-down direction from the upper end face to the lower end face (see FIG. 8).

It is not requisite that equal numbers of the light distribution control parts 11 are provided right-left symmetrically. In other words, the light distribution control parts 11 may be different in shape and number between right and left across an intermediate line provided that, in the bilateral direction of the optical lens 10, the radiation direction of light can be apportioned across the intermediate line (which is not necessarily the center line located at the middle between opposite ends) that delineates a border between one end side and the other end side, each toward one direction of the bilateral direction that intersects the optical axes of the LEDs 22 and further direction that is opposite thereto.

(Light Distribution Control on One Side)

Assuming that the optical lens 10 is divided between opposite sides at the center line L (see FIG. 1) as a border in the bilateral direction, in the light distribution control parts 11 on one side half, optical paths each directing light entering from the LEDs 22 in a column corresponding to each of the light distribution control parts 11 to an optical axis direction are sequentially shortened from around the center (one end side) to the outside (the other end side) in the bilateral direction in this order. In the embodiment, there are only 2 light distribution control parts 11 on one side half of the optical lens 10, although 3 or more light distribution control parts may be arranged.

When the length of the optical path of the light distribution control part 11 is reworded as height, for example, the 2 light distribution control parts 11C, 11D on a right side half are configured to discharge light entering from the LEDs 22 in the corresponding column in the same one direction (the further direction) of the bilateral direction that intersects the optical axes of the LEDs 22 from a position at a height (front-rear position) at which no interference with the light distribution control part 11 adjacent to the outside (the other end side) occurs. In the embodiment, the light distribution control parts 11C, 11D have portions (emergent part 14 described later) that are lowered stepwise from one end side to the other end side of the bilateral direction in this order, the portions each discharging light in the same one direction (the further direction) from a top end side of each of the light distribution control parts.

The same applies, but right-left symmetrically, to the light distribution control parts 11A, 11B on a left side half of the optical lens 10, and the 2 light distribution control parts 11A, 11B are configured to discharge light entering from the LEDs 22 in the corresponding column in the same one direction (the one direction) of the bilateral direction that intersects the optical axes of the LEDs 22 from a position at a height (front-rear position) at which no interference with the light distribution control part 11 adjacent to the outside (the other end side) occurs. Note that separate members for opposite right and left sides of the optical lens 10 may be formed in advance and integrally combined subsequently.

(Details of Light Distribution Control Part)

As illustrated in FIG. 1, the light distribution control parts 11 have a common basic configuration each other, although they are different in size and orientation. In other words, each of the light distribution control parts 11 includes an incident part 12, a reflective part 13, and an emergent part

14. The incident part 12 is disposed facing the LEDs 22 on a column basis, and is a portion where light centered on the optical axes from the LEDs 22 enters. The reflective part 13 is a portion where a route of light arriving from the incident part 12 is altered to the one direction or the further direction by total reflection at a position facing a front of the incident part 12. The emergent part 14 is a portion where light totally reflected from the reflective part 13 is discharged to an outside at a position facing a side of the reflective part 13.

As illustrated in FIG. 6, the incident part 12 is on the rear face side of the optical lens 10, and the incident part 12 is provided with rectangular areas corresponding to a plurality of LEDs 22 arranged on a column basis on the circuit board 21 (see FIG. 10) in a grid form. For each grid cell, an incident surface, the sectional shape of which is an arc shape centered on the optical axes of the LEDs 22 and bulging outward, is formed. Each area of the incident part 12 is designed as a free-form surface such that light entering from the LEDs 22 can easily be collected to an extent that the light is not in parallel to the optical axes.

As illustrated in FIG. 10, 6 LEDs 22 for each column of the LEDs 22 are practically arranged on the circuit board 21, while in the embodiment, columns of similar rectangular areas are added one row for each of the upper and lower ends of the optical lens 10. The entire length of such a light distribution control part 11 in the longitudinal direction is a design matter that can be altered as necessary, and has been made in consideration of light distribution at the upper and lower ends of the optical lens 10, for example.

Figure 2:
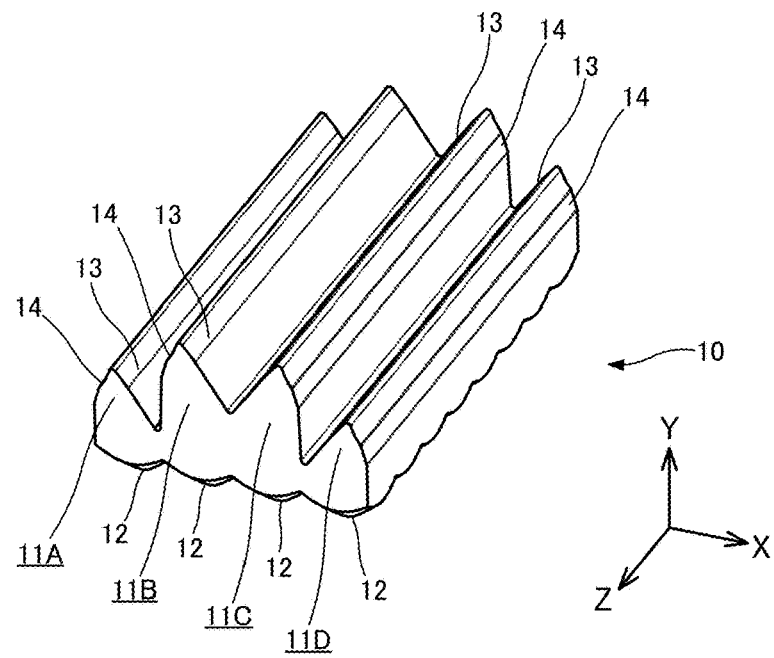
FIG. 2 is a perspective view illustrating the optical lens according to the first embodiment of the present invention.
Figure 3:
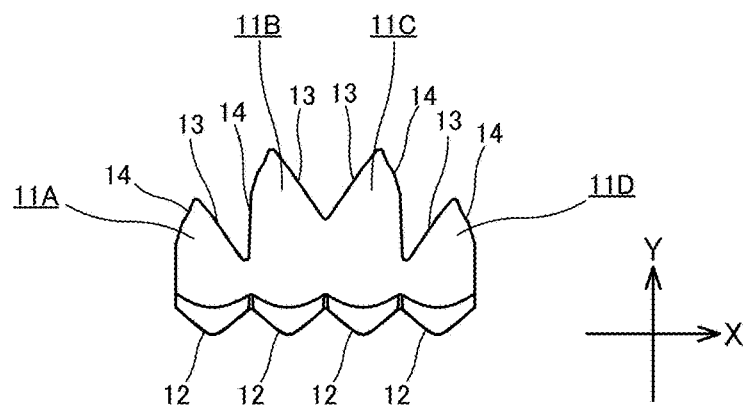
FIG. 3 is a bottom view illustrating the optical lens according to the first embodiment of the present invention.
Figure 4:
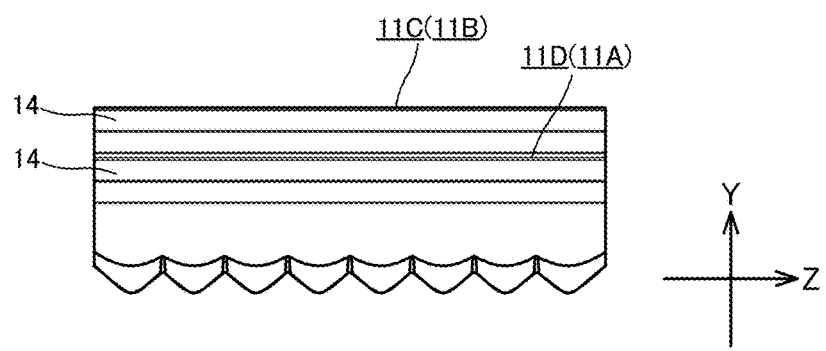
FIG. 4 is a side view illustrating the optical lens according to the first embodiment of the present invention.
Figure 5:
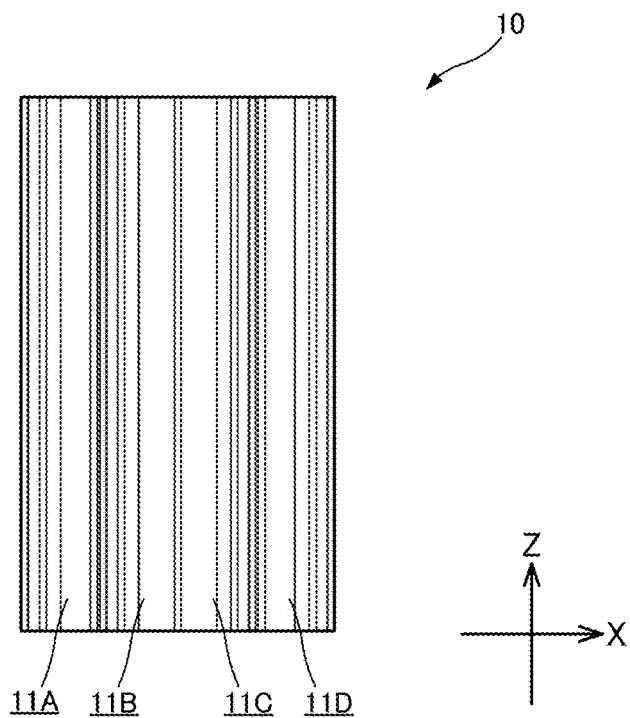
FIG. 5 is a front view illustrating the optical lens according to the first embodiment of the present invention.

As illustrated in FIGS. 1 and 2, the reflective part 13 has a total incident surface, which obliquely intersects the optical axes of the LEDs 22 in the sectional shape at a position facing the front of the incident part 12 on the front face side of the optical lens 10. The total incident surface is designed to be at a critical angle such that light arriving from the incident part 12 is totally reflected and the optical path is altered to one direction (or further direction) of the bilateral direction that intersects the optical axes on a column basis of the LEDs 22. The total incident surface may be designed as a free-form surface such that the optical path of arriving light is totally reflected to the one direction (or further direction) while a predetermined expansion is provided for reflected angles in the front-rear direction and the up-down direction.

The emergent part 14 has an emergent surface, which is inclined oppositely to the total incident surface from the top end as a border at a position facing the side of the reflective part 13 in the sectional shape. The emergent surface may discharge light totally reflected from the reflective part 13 to the outside at substantially the same angle, or may be designed as a free-form surface such that a predetermined expansion is provided for reflected angles in the front-rear direction and the up-down direction. In particular, the refractive index of light at the emergent surface may be defined as necessary in consideration of an interrelation between the refractive index and the refraction when discharged light from the emergent part 14 passes through a globe 4 described later, for example. The same applied to the reflective part 13.

(Front Light Distribution Control)

A recessed groove is provided between the light distribution control parts 11, the recessed groove having a substantially V-shaped section between an inclined outer surface (outside of the total incident surface) of the reflective part 13 and an outer surface extending downward from the emergent surface of the emergent part 14. Such a recessed groove between the light distribution control parts 11 does not particularly contribute to light distribution control, and is a region from which light centered on the optical axes from the LEDs 22 is dischargeable to an outside as it is.

<Configuration of Car Side Pilot Lamp>

Figure 13:
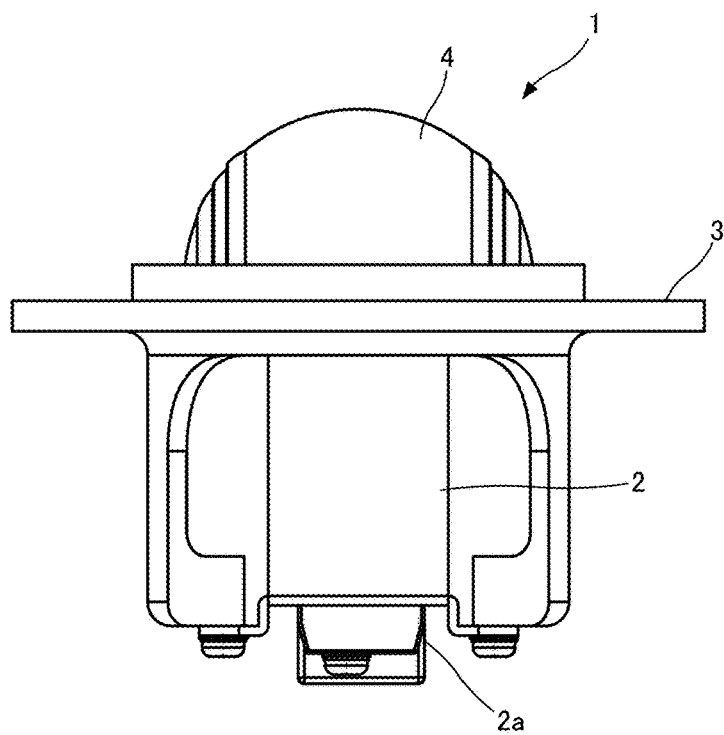
FIG. 13 is a front view illustrating the car side pilot lamp provided with the optical lens according to the first embodiment of the present invention.
Figure 14:
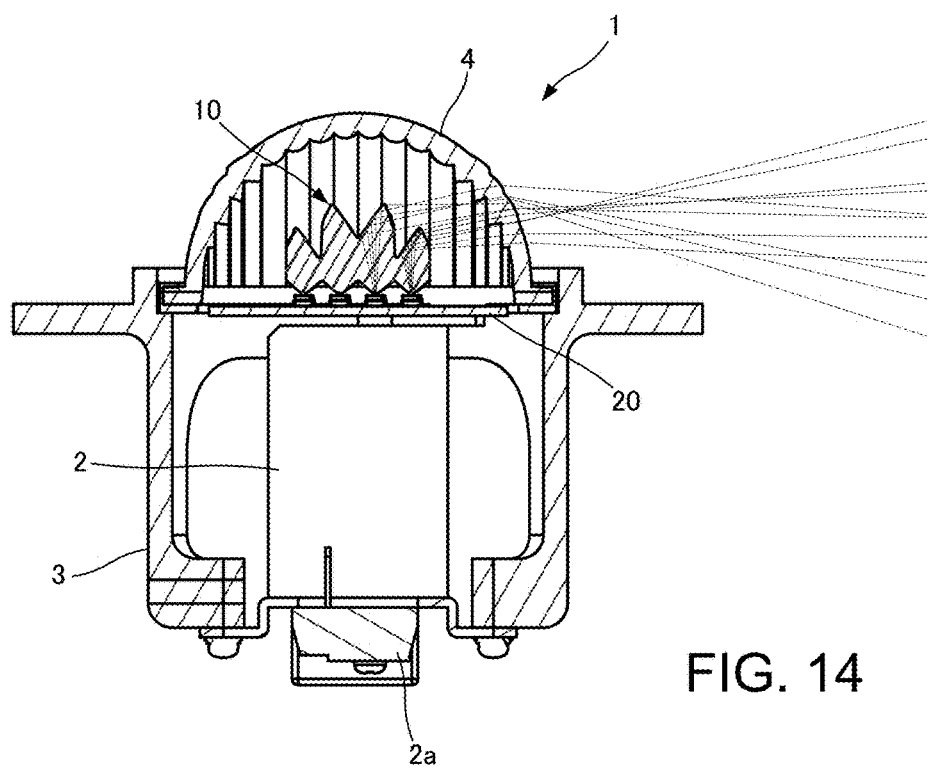
FIG. 14 is an explanatory drawing illustrating light distribution control of the car side pilot lamp provided with the optical lens according to the first embodiment of the present invention.
Figure 15:
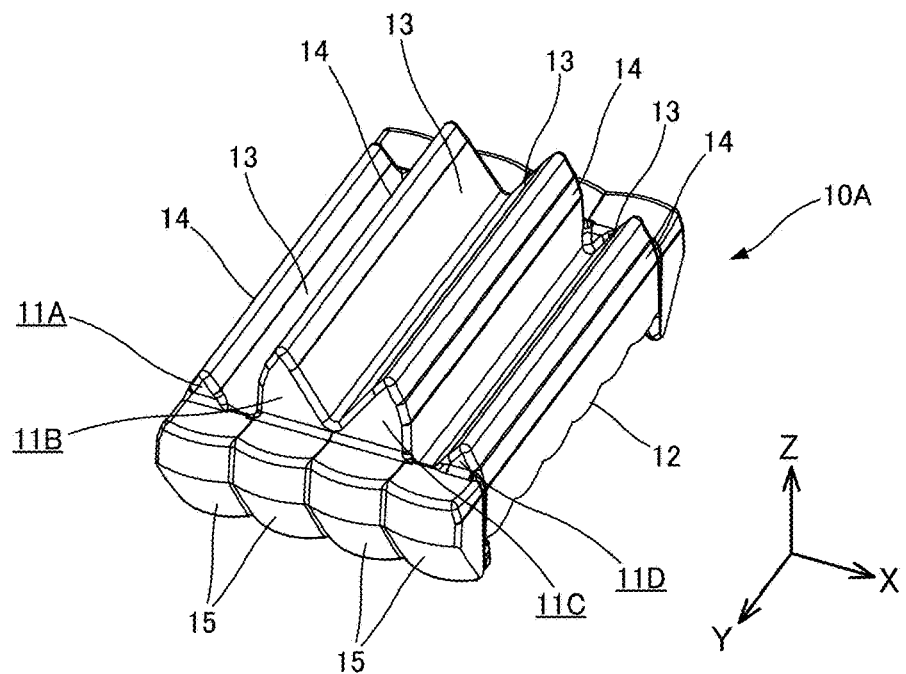
FIG. 15 is a perspective view illustrating an optical lens according to a second embodiment of the present invention.
Figure 16:
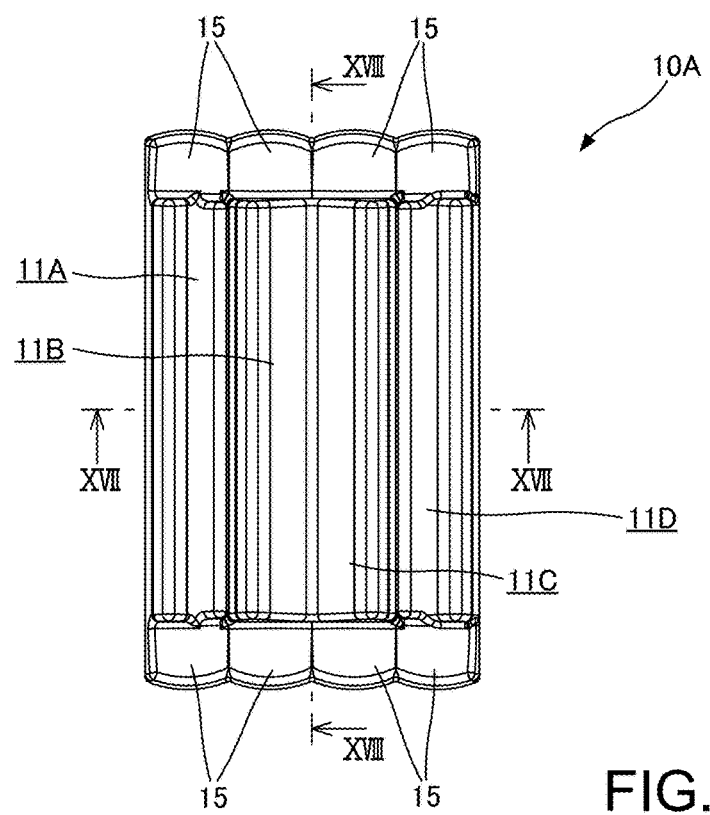
FIG. 16 is a front view illustrating the optical lens according to the second embodiment of the present invention.
Figure 17:
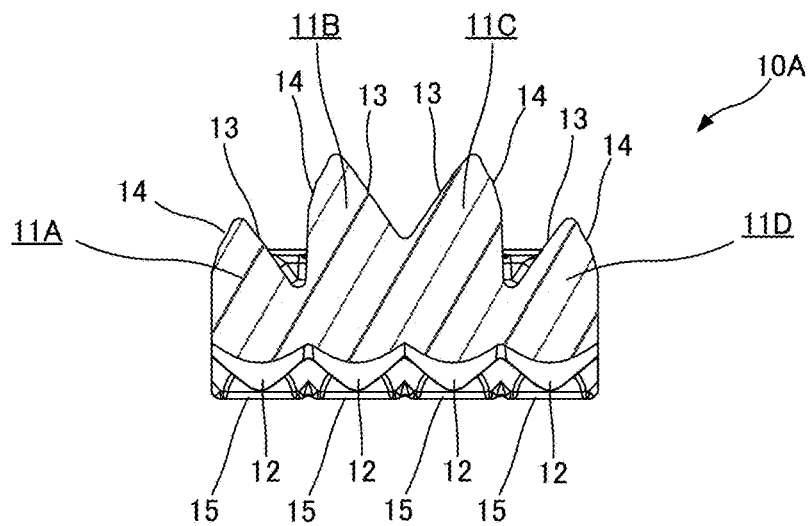
FIG. 17 is a line XVII-XVII sectional view of FIG. 16.
Figure 18:
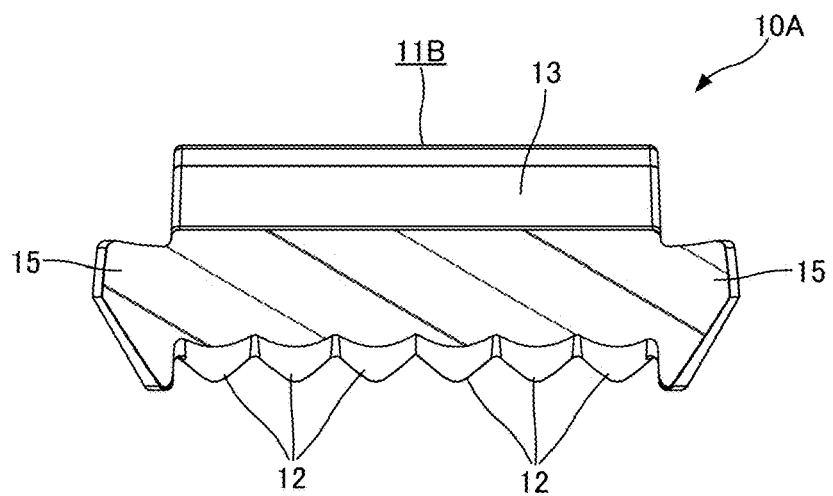
FIG. 18 is a line XVIII-XVIII sectional view of FIG. 16.

As illustrated in FIGS. 13 and 14, the car side pilot lamp 1 includes an attachment base 2 that supports the above-described optical lens 10 and the light source 20, a lamp body 3 that contains the attachment base 2, the globe 4 that surrounds the optical lens 10 on the upper end side of the lamp body 3, and the like. Note that FIGS. 7 to 10 illustrate the attachment base 2 picked out of the car side pilot lamp 1 and the optical lens 10 and the light source 20 attached onto the attachment base 2.

For example, the lamp body 3 is formed of metal or the like into a hollow cylinder. The attachment base 2 is, for example, formed from a sheet metal with a pair of side plates standing on the opposite sides of the bottom plate, and the circuit board 21 of the light source 20 is assembled between the upper ends of the side plates. Although the internal structure of the attachment base 2 is omitted in the drawings, a terminal block 2*a* is assembled on the bottom plate of the attachment base 2.

The globe 4 is a transparent member that has a dome shape covering the optical lens 10 and the light source 20 on the attachment base 2 in a surrounding manner, and is formed, for example, of glass or synthetic resin. As illustrated in FIG. 14, the inner circumference side of the globe 4 may be formed as a lenticular surface that refracts light discharged from the optical lens 10 as necessary. For example, a design may be made such that light is diffused with a substantially even intensity distribution centered on the direction perpendicular to the optical axes of the LEDs 22 from the outer surface of the globe 4.

<Effect of Optical Lens>

The effect of the optical lens 10 according to the embodiment will now be described.

(Light Distribution Control in Bilateral Sides)

As illustrated in FIG. 1, in the optical lens 10, the light distribution control parts 11A, 11B to the left and the light distribution control parts 11C, 11D to the right are arranged right-left symmetrically at the center line L as a border in the bilateral direction. Here, the light distribution control parts 11 each correspond to each of 4 columns of the LEDs 22 arranged in the bilateral direction on the circuit board 21 on a column basis. Then, the optical paths of light are defined by the light distribution control parts 11 on a column basis of the LEDs 22.

Among the light distribution control parts 11, the light distribution control parts 11A, 11B to the left discharge light entering from the 6 LEDs 22 located in a column corresponding to them to one direction (left direction of the paper in FIG. 1) of the bilateral direction that intersects the optical axes of the LEDs 22. Further, the light distribution control parts 11C, 11D to the right discharge light entering from the 6 LEDs 22 located in a column corresponding to them to a further direction opposite to the one direction (right direction of the paper in FIG. 1) of the bilateral direction that intersects the optical axes of the LEDs 22.

As illustrated by light beams in FIG. 1, the light discharged frontward (in Y-axis direction) from LEDs 22 arranged on the circuit board 21 is distributed by the light distribution control parts 11 toward the bilateral sides that intersect the optical axes of the LEDs 22. In particular, in the embodiment, the radiated light from the optical lens 10 to the bilateral sides is also directed right-left symmetrically across the center line L in the bilateral direction to the direction that is substantially perpendicular to the optical axes of the LEDs 22 (X-axis direction).

In this way, the light distribution control by the light distribution control parts 11 to one direction and a further direction in the bilateral direction makes it possible to achieve radiation such that peaks of luminous intensity appear even in the bilateral sides that are substantially perpendicular to the optical axes where the luminous intensity would otherwise be low by means of normal LEDs 22. Further, light will not be diffused in the entire circumference direction around the optical axes, loss of light distribution to directions in which radiation is unnecessary is eliminated, and it is possible to focus light at high luminous intensity in one direction and a further direction of the bilateral direction. In particular, in the embodiment, since equal numbers of the light distribution control parts 11 are provided right-left symmetrically across the center line L of the bilateral direction of the optical lens 10, light can be distributed with an even intensity distribution to one direction and a further direction.

(Light Distribution Control on One Side)

As illustrated in FIG. 1, in the optical lens 10, in the light distribution control parts 11 in opposite right and left sides at the center line L as a border in the bilateral direction, optical paths each directing light entering from the LEDs 22 in a column corresponding to each of the light distribution control parts 11 to an optical axis direction are sequentially shortened from around the center (one end side) to the outside (the other end side) in this order. Here, when the length of the maximum optical path of the light distribution control part 11 is reworded as height, for example in the right side half, the light distribution control part 11C near the center is higher and the light distribution control part 11D outside is lower.

In this way, lowering the light distribution control parts 11 sequentially in their height makes it possible to discharge light entering from the LEDs 22 in the corresponding column in the same one direction (the further direction) of the bilateral direction that intersects the optical axes of the LEDs 22 from a position at a height at which no interference with the light distribution control part 11 adjacent to the outside (the other end side) occurs. In this way, even though arranged in the bilateral direction, the light distribution control parts 11 are not disturbed in discharging light by further light distribution control parts 11 located on a light radiation side, and it is possible to discharge the corresponding light for each column of the LEDs 22 efficiently to the same one direction.

In particular, in the embodiment, the light distribution control parts 11C, 11D have portions (emergent part 14), each of which discharges light in the same one direction (the further direction) from a top end side of each of the light distribution control parts, are sequentially lowered stepwise. Accordingly, it is possible to distribute light with an even intensity distribution for each of the light distribution control parts 11C, 11D from positions that are different in a stepwise manner to the same one direction. The transverse width (corresponding to a tread of a step) of each of the light distribution control parts 11C, 11D arranged stepwise is substantially equal to each other so as to correspond to the spacing between the columns of the LEDs 22, although it may not necessarily be equal if the columns of the LEDs 22 are differently spaced. The same applies to the light distribution control parts 11A, 11B of the left side half of the optical lens 10, and therefore duplicated description is not repeated.

(Details of Light Distribution Control)

In FIG. 1, light radiated from each of 6 LEDs 22 arranged for every 4 columns on the circuit board 21 of the light source 20 enters the incident part 12 of the light distribution control parts 11 of the optical lens 10 correspondingly facing the LEDs 22. The light entering from the incident part 12 travels frontward around the optical axes of the LEDs 22. With the incident part 12, light from the individual LED 22 can be received thoroughly and directed efficiently toward the reflective part 13 located ahead of the optical axes of the LEDs 22 while collected at an appropriate radiation angle.

Subsequently, when light travelling from the incident part 12 frontward in the light distribution control part 11 is arrived at the reflective part 13, the route of the light is altered to one direction or a further direction as described above by total reflection at a total reflection surface. With the total reflection in the reflective part 13, it is possible to achieve light distribution control efficiently even in the direction that is substantially perpendicular to the optical axes of the LEDs 22, and cause the light to travel easily in a desired direction.

Figure 12:
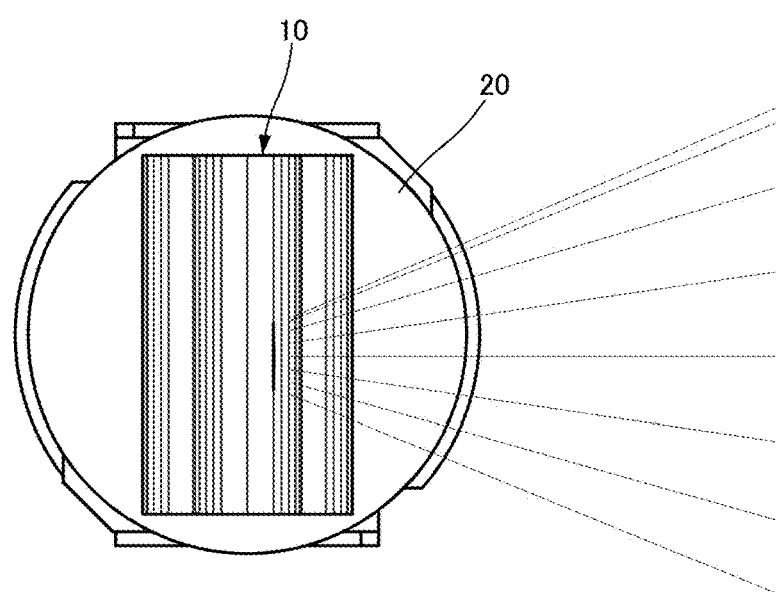
FIG. 12 is an explanatory drawing illustrating light distribution control of the car side pilot lamp provided with the optical lens according to the first embodiment of the present invention.

Here, "substantially perpendicular" does not mean a right-angled intersection in a strict sense, but is enough if a substantially right-angled intersection can be viewed to a certain extent. In the embodiment, as illustrated in FIG. 1, one direction or a further direction of light totally reflected by the reflective part 13 is inclined slightly frontward (upward direction of the paper in FIG. 1) from the direction that is perpendicular to the optical axes of the LEDs 22 and slightly expanded in the front-rear direction, and as illustrated in FIG. 12, an expansion is also provided in the up-down direction with respect to the direction that is perpendicular to the optical axes.

When arrived at the emergent part 14, the light totally reflected by the reflective part 13 is kept at substantially the same angle or refracted such that a further expansion is provided in the front-rear direction or the up-down direction, and discharged to the outside. Light discharged from the emergent part 14 can be caused to pass through the globe 4 such that the range of the radiation angle is further expanded, the diffusion effect of light is enhanced, or luminance is made in a desired color.

With a series of refraction and reflection of light by the incident part 12, the reflective part 13, and the emergent part 14 as described above, it is possible to efficiently achieve light distribution control to one direction and a further direction in the bilateral direction of the optical lens 10. Generally, the total reflection exhibits higher reflectance of light than the specular reflection. Accordingly, by using the total reflection of the optical lens 10, it is possible to achieve light distribution control efficiently, and cause the light to travel easily in a desired direction, leading to a higher light-extraction efficiency.

(Front Light Distribution Control)

In FIG. 1, a recessed groove is provided between the light distribution control parts 11, the recessed groove having a substantially V-shaped section between an inclined outer surface (outside of the total incident surface) of the reflective part 13 and an outer surface extending downward from the emergent surface of the emergent part 14. Such a recessed groove between the light distribution control parts 11 does not particularly contribute to light distribution control, and light centered on the optical axes from the LEDs 22 is discharged frontward freely as it is.

In this way, even in front of the optical lens 10 to which the optical axes of the LEDs 22 are directed, sufficiently viewable light can be radiated, although relatively low in the luminous intensity. Accordingly, it is possible to secure light distribution in front (facing side) of the lamp itself, which is required for the car side pilot lamp 1, for example. Note that frontward radiation light can be supplemented by light leaking without being totally reflected by the reflective part 13 or light leaking from the emergent part 14.

(Other Effects)

In addition, since the optical lens 10 can be integrally formed only from a single transparent material, the structure can be simplified such that the production can be facilitated and the costs can be reduced. Note that results of light beams tracing of radiation light by the optical lens 10 are not greatly different between actual measurements and computer simulations.

As illustrated in FIG. 13, the optical lens 10 described above is applied to the car side pilot lamp 1. According to the optical lens 10, it is possible with a simple configuration to achieve ideal light distribution required for the car side pilot lamp 1, that is, luminance control such that light is radiated in 2 directions on the bilateral sides (front and rear of the vehicle) of the lamp itself and also in front (vehicle side) of the lamp itself efficiently and easily.

Generally, a station staff or conductor views from the front or rear of the vehicle to check that the car side pilot lamp is lit. Here, when the luminous intensity of the car side pilot lamp in the bilateral direction is low, it has been difficult to accurately determine that the car side pilot lamp is lit because it is difficult to distinguish from other light such as reflection on the vehicle exterior wall. In contrast, according to the car side pilot lamp with the optical lens 10, it is possible to accurately determine that the lamp is lit.

While the LEDs 22 of the light source 20 are arranged on the circuit board 21 in a matrix form, connections of wiring circuits to the LEDs 22 may be configured such that the balance in a lit state between opposite right and left sides of the car side pilot lamp 1 is not affected even when a failure such as a broken wire occurs in any of the LEDs 22.

Second Embodiment

FIGS. 15 to 19 illustrate a second embodiment.

An optical lens 10A according to the second embodiment is basically in a similar configuration to the optical lens 10 according to the first embodiment, except that additional light distribution control parts 15 are provided to upper and lower ends of the light distribution control part 11. With regard to the light distribution control in the bilateral sides, the light distribution control on one side, details of the light distribution control, and the front light distribution control by means of similar portions to the first embodiment, duplicated description is not repeated.

<Configuration of Optical Lens>

As illustrated in FIGS. 15 to 18, on upper and lower ends of the light distribution control parts 11 in an up-down direction perpendicular to the bilateral direction, the additional light distribution control parts 15 each refract light from the LEDs 22 overlapping near the respective upper and lower ends to at least above the upper end and at least below the lower end. It is possible with the additional light distribution control parts 15 to sufficiently capture and utilize light also from ones on the upper and lower ends among 6 LEDs 22 arranged on a 4-column basis.

The upper and lower additional light distribution control parts 15 are enough if provided with a free-form surface such that light entering from LEDs 22 on the upper and lower ends can be refracted to above the upper end or below the lower end, at which the upper or lower additional light distribution control parts 15 is located respectively, and therefore a specific shape thereof is a design matter that can be defined as necessary. For example, in the second embodiment, each of the additional light distribution control parts 15 is shaped in a divided form for the corresponding light distribution control part 11, although it may have the same sectional shape that is uniform over the entire width of the bilateral direction.

<Effect of Optical Lens>

Figure 19:
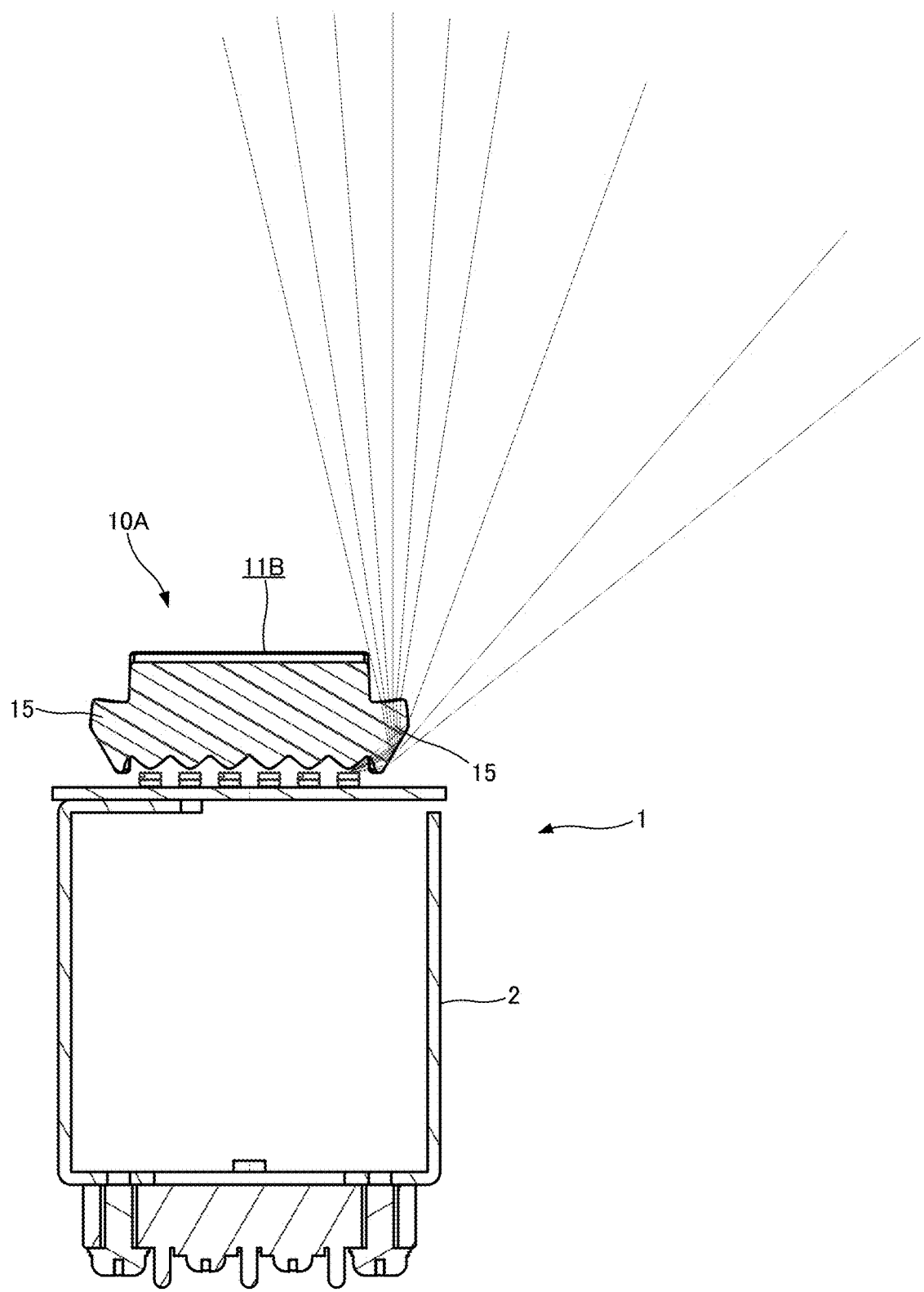
FIG. 19 is an explanatory drawing illustrating light distribution control of the optical lens according to the second embodiment of the present invention.
Figure 20:
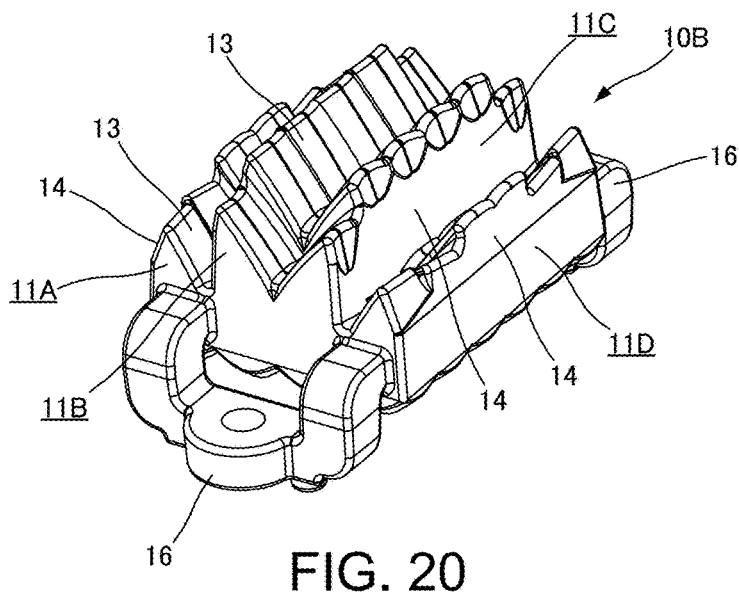
FIG. 20 is a perspective view illustrating an optical lens according to a third embodiment of the present invention.
Figure 21:
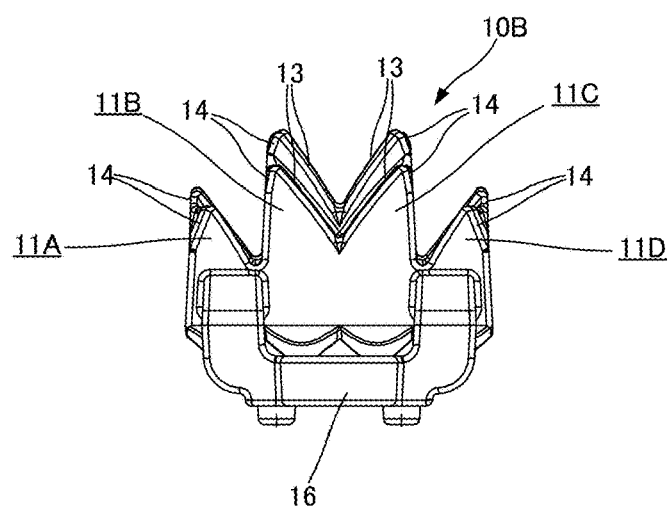
FIG. 21 is a bottom view illustrating the optical lens according to the third embodiment of the present invention.
Figure 22:
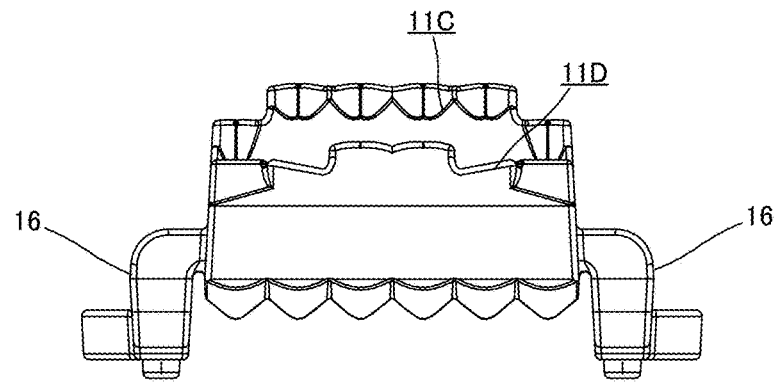
FIG. 22 is a side view illustrating the optical lens according to the third embodiment of the present invention.
Figure 23:
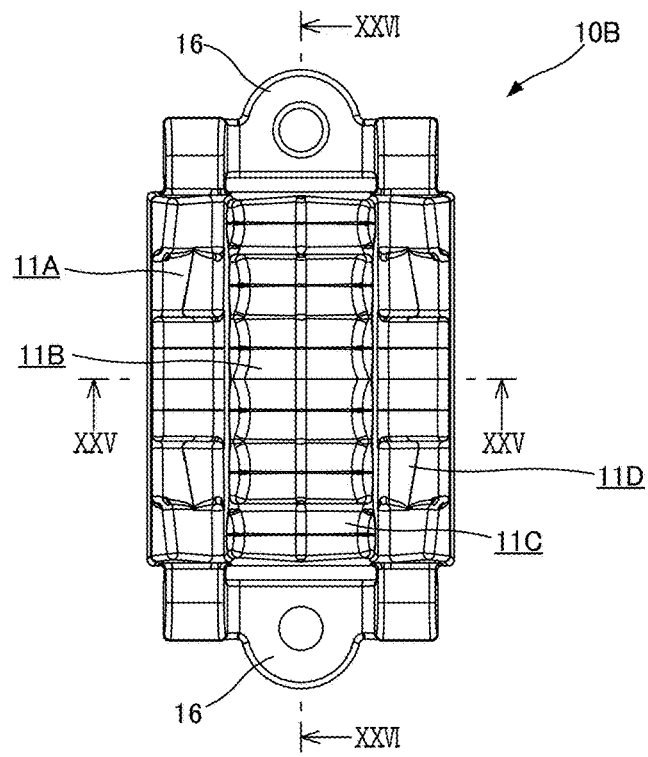
FIG. 23 is a front view illustrating the optical lens according to the third embodiment of the present invention.
Figure 24:
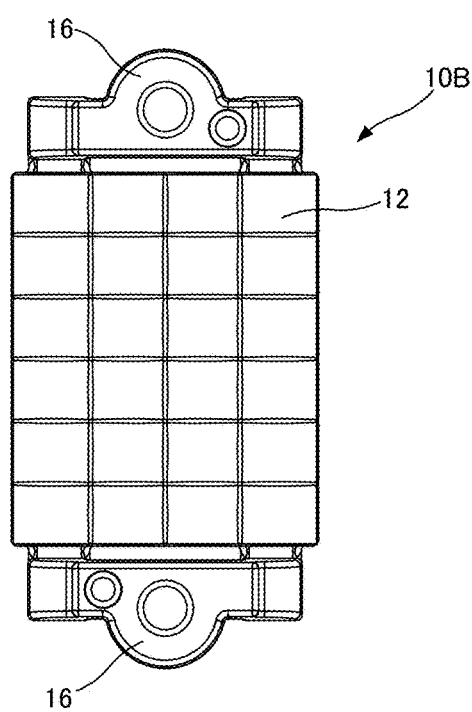
FIG. 24 is a back view illustrating the optical lens according to the third embodiment of the present invention.
Figure 25:
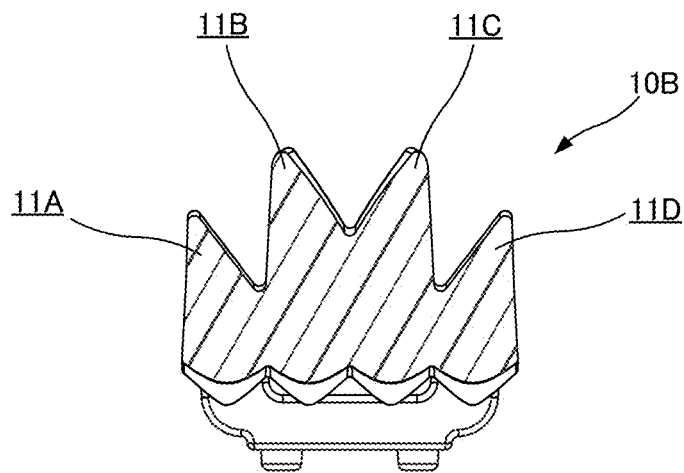
FIG. 25 is a line XXV-XXV sectional view of FIG. 23.
Figure 26:
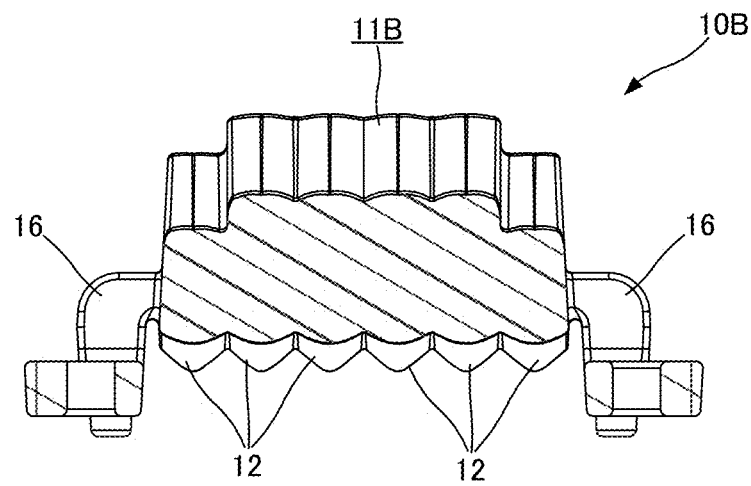
FIG. 26 is a line XXVI-XXVI sectional view of FIG. 23.
Figure 27:
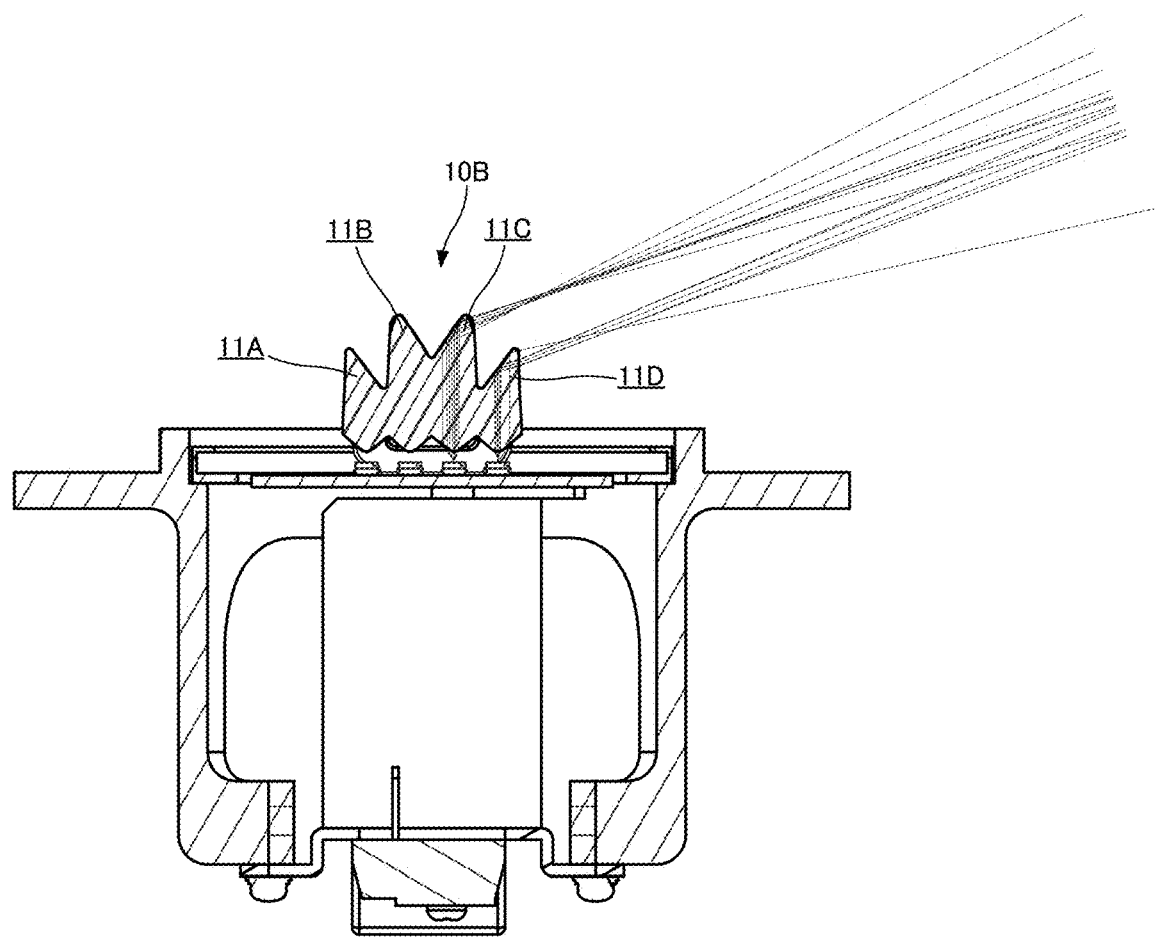
FIG. 27 is an explanatory drawing illustrating light distribution control of a car side pilot lamp provided with the optical lens according to the third embodiment of the present invention.

As illustrated in FIG. 19, the additional light distribution control part 15 continuing to the upper end of the light distribution control part 11 causes light from the LEDs 22 overlapping near the upper end to be refracted such that it is locally expanded above. Similarly, the additional light distribution control part 15 on the lower end of the light distribution control part 11 also causes light from the LEDs 22 overlapping near the lower end to be refracted such that it is locally expanded below.

In this way, it is possible to expand the radiation range of the optical lens 10A in the up-down direction. Accordingly, when the optical lens 10A radiates light, the luminance surface area when seen from the front will not be viewed smaller, and it looks bright entirely including the up-down direction, which enhances the appearance. Note that like portions as those in the first embodiment are given like reference characters and duplicated description is not repeated.

Third Embodiment

FIGS. 20 to 28 illustrate a third embodiment.

An optical lens 10B according to the third embodiment is basically in a similar configuration to the optical lens 10 according to the first embodiment, except that the shapes or the like of the top end sides from the upper to lower ends of the light distribution control parts 11 are different. With regard to the light distribution control in the bilateral sides, the light distribution control on one side, details of the light distribution control, and the front light distribution control by means of similar portions to the first embodiment, duplicated description is not repeated.

<Configuration of Optical Lens>

As illustrated in FIGS. 20 to 26, a top end side of each of the light distribution control parts 11, which is located on an opposite side from a side that the LEDs 22 face and extends in the up-down direction perpendicular to the bilateral direction, is shaped such that light from the LEDs 22 is refracted toward the up-down direction, instead of a shape along a straight line in parallel to the circuit board 21. For such a shape, for example, an arcuately bent shape, or a stepped shape that is highest in the center and sequentially lowers toward the upper and lower ends may be conceivable, although in the embodiment, the top end sides of the light distribution control parts 11 are shaped differently for every predetermined interval.

Specifically, in the light distribution control parts 11B, 11C near the center line of the bilateral direction among the light distribution control parts 11, top end sides extending in the up-down direction protrude forward in portions corresponding to 4 areas (incident part 12) near the center of the columns of the LEDs 22 and lower in portions that are opposite ends thereof and correspond to upper and lower end areas (incident part 12).

Further, in the light distribution control parts 11A, 11D on opposite ends of the bilateral direction among the light distribution control parts 11, top end sides extending in the up-down direction protrude forward in portions corresponding to 2 areas (incident part 12) near the center of the columns of the LEDs 22 and lower in portions that are opposite sides thereof and correspond to upper and lower end areas (incident part 12).

The third embodiment is configured to have the reflective parts 13 and the emergent parts 14 of the light distribution control parts 11, each of which has a different shape, for each individual LED 22 of the 6 LEDs 22 arranged for every 4 columns. Here, the number of the light distribution control parts 11 basically correspond to the number of columns of the LEDs 22, although it can be considered to further divide the light distribution control parts 11 for the number of the LEDs for each column (the number of rows).

Further, the shape of the incident part 12 may be adjusted to the shapes of the reflective part 13 and the emergent part 14 for each of the light distribution control parts 11. In contrast to the first embodiment described above, the incident part 12 of the third embodiment is designed to cause light entering from the incident part 12 to go straight (be collimated) in parallel to the optical axes.

Further, when the optical lens 10 is surrounded by the globe 4 as described above, some light beams may be diffused after being focused or the discharging area may be reduced when light entering from the incident part 12 is to be totally reflected by a parabola of the reflective part 13 in order to reduce the effect of the globe 4. This also applies to the first and second embodiments. Note that attachment units 16 for fastening onto the circuit board 21 by using screws and the like are provided on the upper and lower ends of the optical lens 10B. The attachment units 16 does not particularly contribute to light distribution control.

<Effect of Optical Lens>

Figure 28:
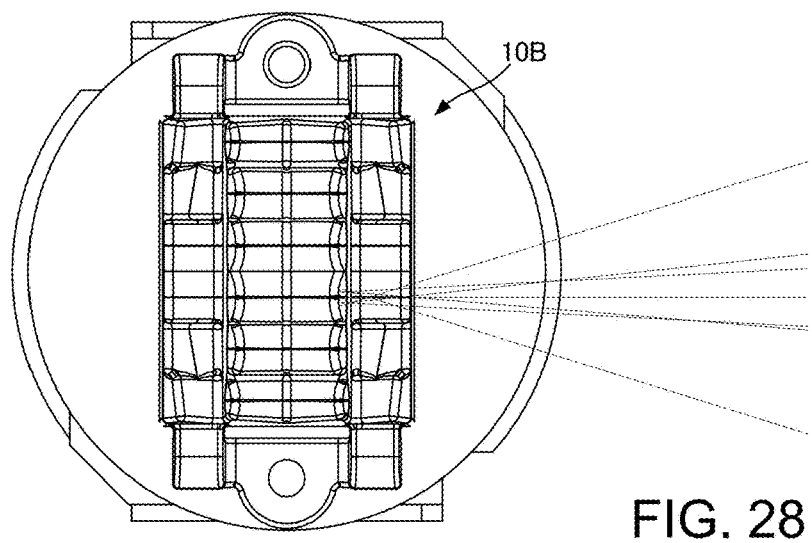
FIG. 28 is an explanatory drawing illustrating light distribution control of the car side pilot lamp provided with the optical lens according to the third embodiment of the present invention.

The top end sides (the reflective part 13 and the emergent part 14) extending in the up-down direction of the light distribution control parts 11 each refract light entering from the LEDs 22 also toward the up-down direction. Specifically, as illustrated in FIG. 28, light radiated to one direction (or further direction) of the bilateral direction from the light distribution control part 11 is reflected so as to expand also in the up-down direction due to the shape of the top end side.

In this way, it is possible to expand the radiation range of the optical lens 10B in the up-down direction for each of the light distribution control parts 11. Accordingly, as with the second embodiment, when the optical lens 10B radiates light, the luminance surface area when seen from the front will not be viewed smaller, and it looks bright entirely including the up-down direction, which enhances the appearance. Note that like portions as those in the first embodiment are given like reference characters and duplicated description is not repeated.

In particular, in the third embodiment, the reflective part 13 and the emergent part 14 located on the top end side of the light distribution control part 11 individually achieve light distribution control with their distinctive shape depending on the area (incident part 12) on an LED 22 basis, a plurality of which are arranged for each column. With such a light distribution control part 11, it is possible to achieve fine light distribution control even on a row basis of the LEDs 22 individually, in addition to the light distribution control on the bilateral sides on a column basis of the LEDs 22 illustrated in FIG. 27 and the light distribution control on one side.

[Configuration and Advantageous Effect of the Present Invention]

Although various embodiments of the present invention have been described, the present invention is not limited to the embodiments. The present invention derived from the various embodiments described above will now be described.

First, the present invention is an optical lens 10, which is disposed in front of a light source 20, for achieving light distribution control of light from the light source 20,
the light source 20 including a plurality of light-emitting elements 22 arranged in at least two or more columns on a circuit board 21 in a bilateral direction and disposed in the same direction such that optical axes are in parallel to each other,
the optical lens 10 comprising a plurality of light distribution control parts 11 continuing in the bilateral direction such that each of the light distribution control parts corresponds to each column of the light-emitting elements 22, the light distribution control parts defining optical paths of light from the light-emitting elements 22 on a column basis, wherein
among the light distribution control parts 11, at least:
one light distribution control part 11 discharges light entering from the light-emitting elements 22 in a column corresponding to the light distribution control part 11 in one direction of the bilateral direction that intersects the optical axes of the light-emitting elements 22; and
a further light distribution control part 11 discharges light entering from the light-emitting elements 22 in a column corresponding to the light distribution control part 11 in a further direction opposite to the one direction of the bilateral direction that intersects the optical axes of the light-emitting elements 22.

According to the present invention, in the optical lens 10, a plurality of light distribution control parts 11 continue in the bilateral direction corresponding to each column of the light-emitting elements 22. Each of the light distribution control parts 11 corresponds to each column of the light-emitting elements 22 arranged in a plurality of columns in the bilateral direction on the circuit board 21. The light distribution control parts 11 define optical paths of light for each column of the light-emitting elements 22.

Among the light distribution control parts 11, at least one light distribution control part 11A or 11B discharges light entering from the light-emitting elements 22 in a column corresponding to the light distribution control part 11 in one direction of the bilateral direction that intersects the optical axes of the light-emitting elements 22. Further, at least a further light distribution control part discharges light entering from the light-emitting elements in a column corresponding to the light distribution control part in a further direction opposite to the one direction of the bilateral direction that intersects the optical axes of the light-emitting elements.

In this way, it is possible to achieve radiation such that peaks of luminous intensity appear even in the bilateral sides that are substantially perpendicular to the optical axes where the luminous intensity would otherwise be low by means of normal light-emitting elements 22. Further, light will not be diffused in the entire circumference direction around the optical axes, loss of light distribution to directions in which radiation is unnecessary is eliminated, and it is possible to focus light at high luminous intensity in one direction and a further direction of the bilateral direction.

Further, in the present invention, equal numbers of the light distribution control parts 11 are provided right-left symmetrically across a center line L of the bilateral direction of the optical lens 10, light distribution control parts 11 including the one light distribution control part 11 on one of right and left sides discharge light entering from light-emitting elements 22 in a column corresponding to the light distribution control parts 11 in the one direction, and light distribution control parts 11 including the further light distribution control part 11 on the other of the right and left sides discharge light entering from light-emitting elements 22 in a column corresponding to the light distribution control parts 11 in the further direction.

According to the present invention, it is possible to achieve an even intensity distribution of light in the radiation range on both in the one direction in which light is discharged from the light distribution control part 11 on one of right and left sides and in the further direction in which light is discharged from the light distribution control part 11 on the other of the right and left sides.

Further, in the present invention, the light distribution control parts 11 each include:

an incident part 12 disposed facing the light-emitting elements 22 on a column basis, wherein light centered on the optical axes from the light-emitting elements 22 enters the incident part 12;

a reflective part 13 for altering a route of light arriving from the incident part 12 to the one direction or the further direction described above by total reflection at a position facing a front of the incident part 12, and an emergent part 14 for discharging light totally reflected from the reflective part 13 to an outside at a position facing a side of the reflective part 13.

According to the present invention, light radiated from light-emitting elements 22 on a column basis of the light source 20 enters the incident part 12 of the light distribution control parts 11 correspondingly facing the light-emitting elements 22. The light entering from the incident part 12 travels frontward around the optical axes of the light-emitting elements 22.

when light from the incident part 12 arrives at the reflective part 13, the route of the light is altered to one direction or a further direction by total reflection. With such total reflection, it is possible to achieve light distribution control efficiently even in the direction that is substantially perpendicular to the optical axes of the light-emitting elements 22, and cause the light to travel easily in a desired direction.

When arrived at the emergent part 14, the light totally reflected by the reflective part 13 is discharged to the outside toward one direction or a further direction.

With a series of refraction and reflection of light by the incident part 12, the reflective part 13, and the emergent part 14 as described above, it is possible to efficiently achieve light distribution control to one direction and a further direction in the bilateral direction of the optical lens 10.

Further, in the present invention, a region from which light from the light-emitting elements 22 is dischargeable to an outside is defined between the light distribution control parts 11.

According to the present invention, even in the front to which the optical axes of the light-emitting elements 22 are directed, sufficiently viewable light can be radiated, although relatively low in the luminous intensity. Accordingly, it is possible to secure light distribution in front (facing side) of the lamp itself, which is required for the car side pilot lamp 1, for example.

Further, in the present invention, additional light distribution control parts 15 are provided on upper and lower ends of the light distribution control parts 11 in an up-down direction perpendicular to the bilateral direction, each of the additional light distribution control parts 15 refracting light from the light-emitting elements 22 overlapping near the respective upper and lower ends to at least above the upper end and at least below the lower end.

According to the present invention, the additional light distribution control parts 15 on the upper and lower ends of the light distribution control parts 11 also cause light from the light-emitting elements 22 to be refracted so as to be locally expanded to above the upper end and below the lower end. In this way, it is possible to expand the radiation range of the optical lens 10 in the up-down direction.

Further, in the present invention, a top end side of each of the light distribution control parts 11, which is located on an opposite side from a side that the light-emitting elements 22 face and extends in the up-down direction perpendicular to the bilateral direction, is shaped such that light from the light-emitting elements 22 is expanded and refracted in the up-down direction.

According to the present invention, the top end side of each of the light distribution control parts 11 extending in the up-down direction causes light from the light-emitting elements 22 to be expanded and refracted also in the up-down direction. In this way, it is possible to expand the radiation range of the optical lens 10 in the up-down direction for each of the light distribution control parts 11.

[Configuration and Advantageous Effect of Variation of the Present Invention]

A variation of the present invention derived from the embodiments described above is an optical lens 10, which is disposed in front of a light source 20, for achieving light distribution control of light from the light source 20, the light source 20 including a plurality of light-emitting elements 22 arranged in at least two or more columns on a circuit board 21 in a bilateral direction and disposed in the same direction such that optical axes are in parallel to each other, the optical lens 10 comprising a plurality of light distribution control parts 11 continuing in the bilateral direction such that each of the light distribution control parts corresponds to each column of the light-emitting elements 22, the light distribution control parts defining optical paths of light from the light-emitting elements 22 on a column basis, wherein in the light distribution control parts 11, optical paths each directing light entering from the light-emitting elements 22 in a column corresponding to each of the light distribution control parts 11 to an optical axis direction are sequentially shortened from one end side to the other end side in the bilateral direction in this order, and each of the light distribution control parts 11 discharges light entering from the light-emitting elements 22 in the corresponding column from a position at which the light distribution control part does not interfere with a light distribution control part 11 adjacent to the other end side to the same one direction of the bilateral direction that intersects optical axes of the light-emitting elements 22.

According to the variation of the present invention, in the light distribution control parts 11 of the optical lens 10, optical paths each directing light entering from the light-emitting elements 22 in a column corresponding to each of the light distribution control parts to an optical axis direction are sequentially shortened from one end side to the other end side in the bilateral direction in this order. Accordingly, each of the light distribution control parts 11 can discharge light entering from the light-emitting elements 22 in the corresponding column from a position at which the light distribution control part does not interfere with a light distribution control part 11 adjacent to the other end side to the same one direction that intersects optical axes of the light-emitting elements 22.

In this way, even though arranged in the bilateral direction, the light distribution control parts 11 are not disturbed in discharging light by light distribution control parts 11 adjacent to the other end side, and it is possible to discharge the corresponding light for each column of the LEDs 22 efficiently, in particular to the same one direction of the bilateral direction that intersects the optical axes of the light-emitting elements 22. Accordingly, it is possible to achieve radiation such that peaks of luminous intensity appear even in the direction that is substantially perpendicular to the optical axes where the luminous intensity would otherwise be low by means of normal light-emitting elements 22. Further, light will not be diffused in the entire circumference direction around the optical axes, and it is possible to focus light at high luminous intensity in the same one direction.

In the variation of the present invention, the light distribution control parts 11 have portions that are lowered stepwise from one end side to the other end side of the bilateral direction in this order, the portions each discharging light in the same one direction from a top end side of each of the light distribution control parts 11.

According to the variation of the present invention, it is possible to distribute light with an even intensity distribution for each of the light distribution control parts from positions that are different in a stepwise manner to the same one direction without mutual obstruction to radiation of light.

Further, in the variation of the present invention, the light distribution control parts 11 each include:
an incident part 12 disposed facing the light-emitting elements 22 on a column basis, wherein light centered on the optical axes from the light-emitting elements 22 enters the incident part 12;
a reflective part 13 for altering a route of light arriving from the incident part 12 to the same one direction described above by total reflection at a position facing a front of the incident part 12, and
an emergent part 14 for discharging light totally reflected from the reflective part 13 to an outside at a position facing a side of the reflective part 13.

According to the variation of the present invention, light radiated from light-emitting elements 22 on a column basis of the light source 20 enters the incident part 12 of the light distribution control parts 11 correspondingly facing the light-emitting elements 22. The light entering from the incident part 12 travels frontward around the optical axes of the light-emitting elements 22.

when light from the incident part 12 arrives at the reflective part 13, the route of the light is altered to the same one direction by total reflection. With such total reflection, it is possible to achieve light distribution control efficiently even in the direction that is substantially perpendicular to the optical axes of the light-emitting elements 22, and cause the light to travel easily in a desired direction.

When arrived at the emergent part 14, the light totally reflected by the reflective part 13 is discharged to the outside toward the same one direction.

With a series of refraction and reflection of light by the incident part 12, the reflective part 13 and the emergent part 14 as described above, it is possible to efficiently achieve light distribution control to the same one direction in the bilateral direction of the optical lens 10.

[Combination of the Present Invention and Variation of the Present Invention]

The present invention and the variation of the present invention can be combined as necessary: specifically, as an optical lens 10, which is disposed in front of a light source 20, for achieving light distribution control of light from the light source 20,
the light source 20 including a plurality of light-emitting elements 22 arranged in at least two or more columns on a circuit board 21 in a bilateral direction and disposed in the same direction such that optical axes are in parallel to each other,
the optical lens 10 comprising a plurality of light distribution control parts 11 continuing in the bilateral direction such that each of the light distribution control parts corresponds to each column of the light-emitting elements 22, the light distribution control parts defining optical paths of light from the light-emitting elements 22 on a column basis, wherein
among the light distribution control parts 11, at least:
one light distribution control part 11 discharges light entering from the light-emitting elements 22 in a column corresponding to the light distribution control part 11 in one direction of the bilateral direction that intersects the optical axes of the light-emitting elements 22; and
a further light distribution control part 11 discharges light entering from the light-emitting elements 22 in a column corresponding to the light distribution control part 11 in a further direction opposite to the one direction of the bilateral direction that intersects the optical axes of the light-emitting elements 22, and
in the light distribution control parts 11, optical paths each directing light entering from the light-emitting elements 22 in a column corresponding to each of the light distribution control parts 11 to an optical axis direction are sequentially shortened from one end side to the other end side in the bilateral direction in this order, and
each of the light distribution control parts 11 discharges light entering from the light-emitting elements 22 in the corresponding column from a position at which the light distribution control part does not interfere with a light distribution control part 11 adjacent to the other end side to the same one direction of the bilateral direction that intersects optical axes of the light-emitting elements 22. This allows to produce advantageous effects of both the present invention and the variation of the present invention. It goes without saying that other configurations can be combined as necessary.

Although embodiments of the present invention have been described with reference to drawings, specific configurations are not limited to the embodiment described above, and modifications and additions that fall within the scope of the present invention shall be encompassed by the present invention.

For example, the entire shape of the optical lens 10, 10A, or 10B, the number and shapes of the light distribution control parts 11, and specific shapes of the incident part 12, the reflective part 13, and the emergent part 14 are not limited to those illustrated and may be changed as necessary. Further, the optical lens 10, 10A, or 10B is not limited for use with the car side pilot lamp 1 of a railway vehicle and may be used as optical components for various lighting equipment.

INDUSTRIAL APPLICABILITY

The optical lens according to the present invention can be used widely as optical components for various lighting equipment.

REFERENCE SIGNS LIST

1 . . . car side pilot lamp
2 . . . attachment base
3 . . . lamp body
4 . . . globe
10, 10A, 10B . . . optical lens
11A, 11B, 11C, 11D . . . light distribution control part
12 . . . incident part
13 . . . reflective part
14 . . . emergent part
15 . . . additional light distribution control part
16 . . . attachment unit
20 . . . light source
21 . . . circuit board
22 . . . LED (light-emitting elements)

What is claimed is:

1. An optical lens, which is disposed in front of a light source, for achieving light distribution control of light from the light source, the light source including a plurality of light-emitting elements arranged in at least two or more columns on a circuit board in a bilateral direction and disposed in the same direction so that optical axes are in parallel to each other,
the optical lens comprising:
a plurality of light distribution control parts continuing in the bilateral direction so that each of the light distribution control parts corresponds to each column of the light-emitting elements, the light distribution control parts defining optical paths of light from the light-emitting elements on a column basis,
wherein among the light distribution control parts, at least one light distribution control part discharges light entering from the light-emitting elements in a column corresponding to the light distribution control part in one direction of the bilateral direction that intersects the optical axes of the light-emitting elements,
a further light distribution control part discharges light entering from the light-emitting elements in a column corresponding to the light distribution control part in a further direction opposite to the one direction of the bilateral direction that intersects the optical axes of the light-emitting elements, and
additional light distribution control parts are provided on upper and lower ends of the light distribution control parts in an up-down direction perpendicular to the bilateral direction, each of the additional light distribution control parts refracting light from the light-emitting elements overlapping near the respective upper and lower ends to at least above the upper end and at least below the lower end.

2. The optical lens according to claim 1, wherein equal numbers of the light distribution control parts are provided right-left symmetrically across a center line of the bilateral direction of the optical lens,
light distribution control parts including the one light distribution control part on one of right and left sides discharge light entering from the light-emitting elements in a column corresponding to the light distribution control parts in the one direction, and
light distribution control parts including the further light distribution control part on the other of the right and left sides discharge light entering from the light-emitting elements in a column corresponding to the light distribution control parts in the further direction.

3. The optical lens according to claim 1, wherein the light distribution control parts each include:
an incident part disposed facing the light-emitting elements on a column basis, wherein light centered on the optical axes from the light-emitting elements enters the incident part;
a reflective part for altering a route of light arriving from the incident part to the one direction or the further direction by total reflection at a position facing a front of the incident part, and
an emergent part for discharging light totally reflected from the reflective part to an outside at a position facing a side of the reflective part.

4. The optical lens according to claim 1, wherein a region from which light from the light-emitting elements is dischargeable to an outside is defined between the light distribution control parts.

5. The optical lens according to claim 1, wherein a top end side of each of the light distribution control parts, which is located on an opposite side from a side that the light-emitting elements face and extends in the up-down direction perpendicular to the bilateral direction, is shaped such that light from the light-emitting elements is expanded and refracted in the up-down direction.

6. The optical lens according to claim 1, wherein the light distribution control parts are formed in an elongated shape extending in the up-down direction, and
the additional light distribution control parts are disposed outside of the light distribution control parts in the up-down direction.

* * * * *